(12) United States Patent
Frankenberger

(10) Patent No.: US 9,780,579 B2
(45) Date of Patent: Oct. 3, 2017

(54) MOBILE CHARGING STATION

(71) Applicant: Verizon Patent and Licensing Inc., Arlington, VA (US)

(72) Inventor: Horst Frankenberger, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 86 days.

(21) Appl. No.: 14/558,347

(22) Filed: Dec. 2, 2014

(65) Prior Publication Data

US 2016/0156207 A1    Jun. 2, 2016

(51) Int. Cl.
  *H02J 7/00* (2006.01)
  *H02J 7/35* (2006.01)

(52) U.S. Cl.
  CPC .............. *H02J 7/0027* (2013.01); *H02J 7/35* (2013.01); *H02J 7/0052* (2013.01)

(58) Field of Classification Search
  CPC ...... H02J 7/0003; H02J 7/0021; H02J 7/0027; H02J 7/0052; H02J 7/35
  See application file for complete search history.

(56) References Cited

U.S. PATENT DOCUMENTS

| | | | | |
|---|---|---|---|---|
| 3,685,034 A | * | 8/1972 | Hedrick ................. | G01C 5/005 340/870.06 |
| 4,272,104 A | * | 6/1981 | Cuny ................. | A44B 11/2546 280/801.1 |
| 2004/0148831 A1 | * | 8/2004 | Johnston ............. | G09F 15/0037 40/607.03 |
| 2005/0199022 A1 | * | 9/2005 | Friar ................... | E05B 47/0012 70/78 |
| 2006/0053531 A1 | * | 3/2006 | McBride ................. | A41F 9/025 2/317 |
| 2011/0112412 A1 | * | 5/2011 | Sano ................... | A61B 5/02141 600/499 |
| 2012/0161564 A1 | * | 6/2012 | Lee ......................... | H02K 53/00 310/113 |
| 2013/0127594 A1 | * | 5/2013 | Sato ....................... | A47G 29/10 340/5.73 |
| 2013/0241485 A1 | * | 9/2013 | Snyder ................... | B60W 20/11 320/109 |
| 2014/0239883 A1 | * | 8/2014 | Hobson ................. | H02J 7/0027 320/107 |

(Continued)

OTHER PUBLICATIONS https://brightboxcharge.com/experience/ 18 pgs. downloaded Dec. 2, 2014.

(Continued)

*Primary Examiner* — Vuthe Siek

(57) ABSTRACT

A mobile charging station includes a plurality of drawers, an off-the-grid power source and a fastening element. Each of the drawers is configured to allow for secure storage of a mobile device and includes a charging lead and a charging circuit configured to connect to the charging lead and to charge the mobile device connected to the charging lead. The power source is coupled to the plurality of drawers and configured to provide electricity to the charging circuit for charging the mobile device connected to the charging lead. The fastening element is coupled to the plurality of the drawers and configured to secure the charging station to a facility to reduce a possibility of unauthorized removal.

20 Claims, 8 Drawing Sheets

(56) References Cited

U.S. PATENT DOCUMENTS

| | | | |
|---|---|---|---|
| 2015/0254443 A1* | 9/2015 | Blessing | G06F 21/32 |
| | | | 726/7 |
| 2016/0088164 A1* | 3/2016 | Kapec | H04M 17/026 |
| | | | 455/74.1 |
| 2016/0205800 A1* | 7/2016 | Roberts | H05K 7/14 |
| | | | 361/809 |

OTHER PUBLICATIONS https://www.chargebox.com/models/ 1 pg. downloaded Dec. 2, 2014.
https://www.engadget.com/2008/05/16/angstrom-power-shows-off-g2-portable-fuel-cell-power-source/ 4 pgs. downloaded Dec. 2, 2014.
http://www.cnet.com/news/how-verizon-kept-wireless-service-going-after-sandy-hit/ 5 pgs. downloaded Dec. 2, 2014.

\* cited by examiner 210　　210　200
Fixation to a power pole or traffic light securing the unit against unauthorized removal or theft

MOBILE CHARGING STATION

BACKGROUND

In recent years, mobile wireless communications have become increasingly popular, leading to the introduction of various types of mobile devices into the market. The mobile devices are configured to operate on a rechargeable battery with a finite power. Once the battery is depleted, the mobile device may have to be connected to an existing power source (e.g., an electric outlet) to be recharged. The electric outlets can be easily accessible at the user's home or workplace. However, the electric outlets may not be easily accessible in areas with large foot traffic such as airports, bus stops, metro stations, merchant shops, malls, etc. In areas with large foot traffic, a charging station that is coupled to an electric outlet may be set up. These charging stations exist in different forms; however, most of them rely on an existing power source. The charging station that does not depend on an existing power source may not be scalable for large public use. Therefore, a need exists for a portable mobile charging station that is configured to provide charging capabilities at a large scale independent of an existing power source.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
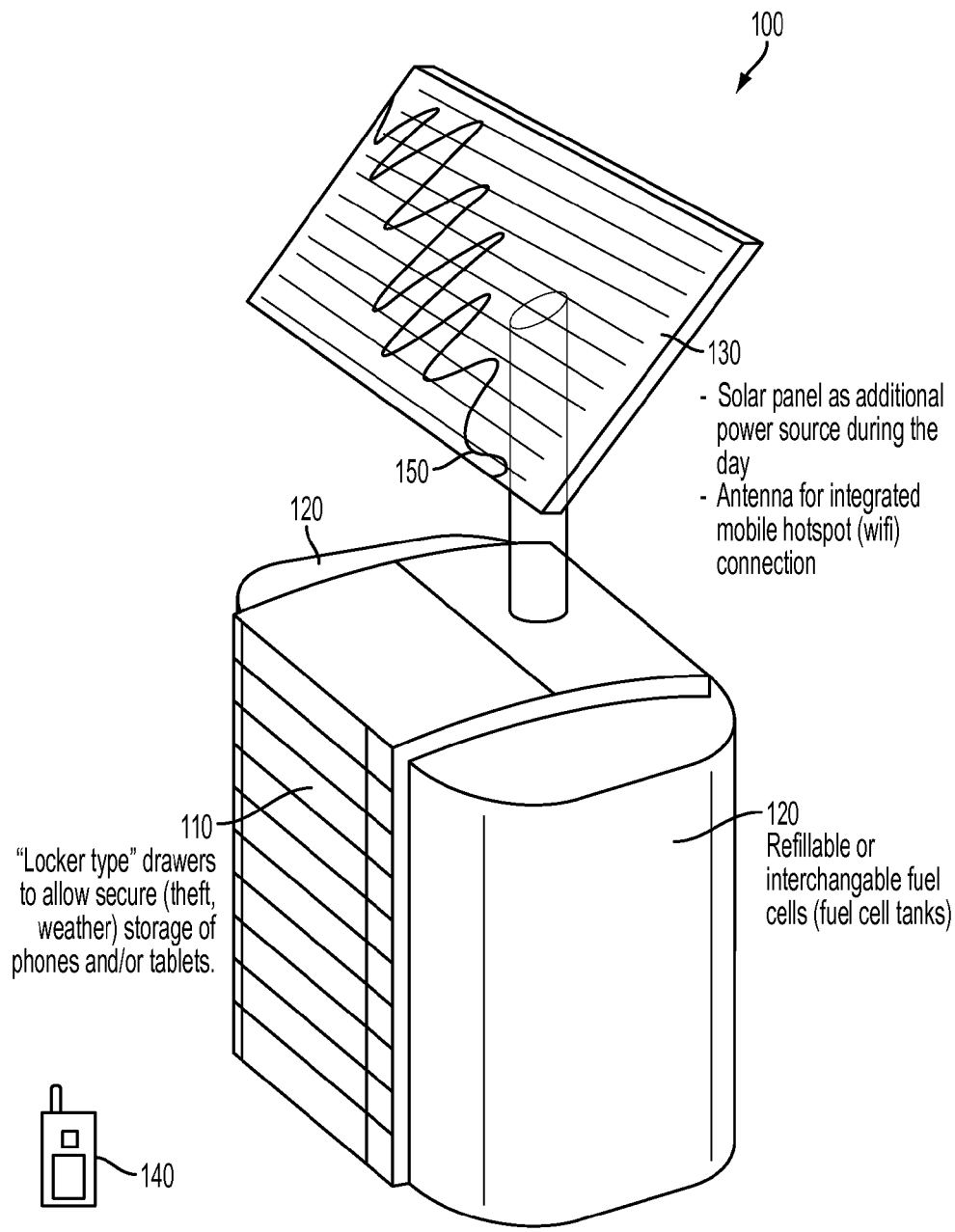
FIG. 1 illustrates an exemplary mobile charging station.

In the following detailed description, numerous specific details are set forth by way of examples in order to provide a thorough understanding of the relevant teachings. In other instances, well known methods, procedures, components, and/or circuitry have been described without detail at a relatively high-level in order to avoid unnecessarily obscuring aspects of the present teachings.

The various systems and methods disclosed herein relate to a mobile charging station that includes a standalone or off-the-grid power source that is configured to provide charging capabilities independent from an existing power source. The off-the-grid power source may include a fuel tank, a battery cell, a solar panel, wind turbine, etc. The existing power source may include a power that is supplied to businesses and homes by the electric power industry through the electric power grid. For example, the existing power source include the electricity provided from the wall outlet at homes, businesses, airports, malls, and other facilities. The charging stations exist in various forms. In one example, the charging station may include a chargebox charging station. The chargebox can be bought or rented and it may be located where there is high volume of foot traffic, such as airports. Like most other charging stations, chargebox is an indoor charging station that is dependent on an existing power source. In one implementation, a chargebox is a 5 feet tower containing six securable lockers in which a user can charge their mobile devices for a predetermined amount of time, for example, 30 to 60 minutes. The chargebox station may include latest chargers and a minimum of four different charging leads within each of its six lockers. The leads may be compatible with 95% of the latest mobile phones. To charge the mobile phone, the user may first find an empty locker with a charging lead compatible with his/her mobile device. The user may then connect the compatible charging lead to the mobile phone to begin charging the phone. To activate the charger, the user may have to make a payment or send a SMS message short code indicated on the kiosk of the chargebox. Once activated, for example, a light on the charger may change color from red to green to inform the user that the charging is in progress.

In another example, the charging station may include a brightbox charging station. Unlike the indoor-only implemented chargebox charging station, the brightbox charging station may be implemented for both indoor and outdoor use. However, similar to the chargebox charging station, brightbox charging station is also dependent on an existing power source. In the brightbox charging station, the user may swipe a card against a card reader to open a chamber. The user may then plug the mobile phone into a compatible charging lead to begin charging the mobile phone. The user may retrieve the charged mobile phone by swiping the same card used to open the chamber against the card reader.

In another implementation, the user may send a text message to the card reader which upon receiving the message opens the chamber. For example, each chamber may include instructions regarding sending a text message, which the user may follow to open the chamber. The instructions may include sending a specific text message (e.g., letters and/or number) to open a chamber. The chamber may include a card therein, which can be later used for opening the chamber to retrieve the mobile station. The user may retrieve the card and plug the user's mobile phone into a compatible charging lead to begin charging the mobile phone. The user may retrieve the charged mobile phone by swiping the card retrieved from the chamber against the card reader.

In another example, the charging station may include an individual fuel cell charging station. The user has to purchase the fuel cell charging station and fill/refill the station with fuel. Unlike the chargebox and the brightbox, the fuel cell charging station is not dependent on an existing power source. Therefore, even when electricity is lost, the fuel cell charging station can still charge the mobile phone as long as it contains sufficient fuel.

In another example, the charging station may include a gasoline generator. The gasoline generator may provide a flexible solution that allows placement of the generator where needed. The generator is dependent on gas availability and the user has to stay and watch his/her mobile phone. The generator may be for outdoor use only and only when appropriate weather permits. The generator may require a staff to operate it.

With the exception of the individual fuel cell charging station, the solutions discussed above are dependent on an existing power source (e.g., electricity and/or gas). Therefore, during disasters when access to a power source may be substantially reduced or eliminated, the charging stations cannot be used to charge mobile phones. The fuel cell charging station may be used to charge the mobile phone; however, it may only be used to charge a mobile phone of the user owning the individual fuel cell charging station. The fuel cell charging station may therefore not provide a secure and flexible solution for the public within the disaster zone to allow them to charge their mobile phones and maintain communications with others.

The instant application, in one implementation, describes a mobile charging station for charging mobile phones and tablets in catastrophic situations. These catastrophic situations may include events such as in 2012 when Hurricane Sandy eliminated or reduced access to existing power sources. The mobile charging station may be a small portable unit that provides charging capabilities independently from an existing power source. These relatively small units may be brought out into urban, suburban, and rural streets. The mobile charging station may be configured to be fixed to equipment that is secure and not easily movable such as, for example, power poles, traffic lights, or other non-removable facilities that could secure the mobile charging station and reduce the possibility of theft or unauthorized removal. The mobile charging station is self-serviced by any phone or tablet user. The user leaves the phone/tablet at the mobile charging station and the key to the 'locker type' charging station may include a 'buzzer' to inform the user of the charging status of the phone/tablet. Alternatively, the 'buzzer' may be replaced with any other audible sound (e.g., a beeping sound or playing of a pre-recorded message or piece of music). According to some examples, the user may personalize a message to be played when the device is done charging, the user may pre-record the message, or the user may select a message from among multiple messages available at the charging station. In some examples, a non-audio signal (e.g., a flashing light, an emitted scent, a vibration of a surface or an object, etc.) may be used in place of or in addition to the audible sound. The mobile charging station may be a fuel-cell system that can be refilled by service personnel, depending on the usage. In one example, the mobile charging station may be an equipment of a mobile service provider such as, Verizon™. During a disaster, Verizon™ service personnel may bring out the mobile charging stations to the affected cities and/or rural areas and secure the mobile charging stations to the landmark structures so that people within the disaster zone can charge their mobile phones. Alternatively or additionally, Verizon™ service personnel may install the mobile charging stations within the Verizon™ stores in the disaster zone. This way a customer can charge his mobile phone at the store and receive a loaner phone while his phone is charging to maintain connectivity with his contacts. The mobile charging station may also include a mobile hotspot that allows people without internet connection to access the internet with or provides connectivity to their phones, tablets or computers.

The use of the fuel cells allows the mobile charging station to be brought into remote areas and the fuel cells to be refilled (or simply exchanged) at the location of the station. The combination of the mobile charging station and information hub (wireless internet connection via a mobile hotspot) allows users to connect to the internet. In addition, service personnel could receive information about the mobile charging station such as work load, fuel cell status, etc . . . The mobile charging station also consists of a geo-locating system that allows the position of all available stations to be located via PCs or cell phone and tablet applications. For example, the mobile charging station may be coupled with a processor and a memory. The memory may record information about the mobile charging station's work load (e.g., frequency of use of each drawer, availability of each drawer, fuel cell charge levels, etc.) Service personnel may own devices (e.g., short-range radios such as Bluetooth®) that are capable of reading the stored information from the memory. One advantage of this embodiment is that service personnel can learn of location(s) where demand for mobile charging station(s) is high and can place additional mobile charging station(s) in those locations. Furthermore, service personnel may also learn of the type(s) of charger(s) that are most in demand. For example, in a community where people primarily use Android® phones and tablets, demand for Android® chargers may be high, while demand for iPhone/iPad® chargers may be low. Upon learning that demand for Android® chargers is high, additional Android® charging drawers may be installed or iPhone/iPad® charging drawers may be replaced with Android® charging drawers.

To illustrate one specific example, the mobile charging station includes a plurality of drawers, a fuel tank, and a fastening element. Each of the plurality of drawers may be configured to allow for secure storage of a mobile device. Each drawer may include a charging lead configured to connect to the mobile device and charge the mobile device. The fuel tank may be coupled to the plurality of drawers and may include a sustainable energy source configured to provide power for charging the mobile device. The fastening element may be coupled to the plurality of the drawers and configured to secure the mobile charging station to a facility. The facility may correspond to a structure that cannot be easily moved and can reduce the possibility of theft or unauthorized removal of the mobile charging station. In one specific example, the fastening element may include a belt, a first real, a second real, and a hook. The first real may be configured to wind up the belt and tighten it. The second real may be configured to keep the belt in position around the facility. The hook may be configured to attach the belt to the mobile charging station.

Reference now is made in detail to the examples illustrated in the accompanying drawings and discussed below.

FIG. 1 illustrates an exemplary mobile charging station 100. The mobile charging station 100 may include a plurality of drawers 110, a fuel tank 120, and a solar panel 130. The drawers 110 provide storage locations for a mobile device 140. The mobile device 140 represents a general class of mobile devices that operate via public cellular networks or the like. To this end, the mobile device 140 includes hardware and software that enables it to act as a mobile phone. The mobile device 140 may be, for example, a wireless phone, a personal digital assistant, a portable e-mail device (e.g., a Blackberry®), a pager, or other electronic devices capable of communicating over a mobile communication network.

The drawers 110 may have different sizes, shapes, arrangements or layouts. In one specific example, as shown in FIG. 1, the drawers 110 are arranged in a single column. In another example, the drawers 110 may be arranged in multiple columns and multiple rows or multiple columns and a single row. Each drawer operates between a close mode and an open mode. The close mode allows no access to the content of the drawer. The open mode allows access to the content of the drawer. A locking mechanism may be used to control access to the content of the drawer. In one implementation as described in more details below, the locking mechanism may include a key and a lock. In another implementation as described in more details below, the locking mechanism may include an ID and an ID reader. Each of the individual drawers may have its own locking mechanism. Alternatively, the drawers may share a single locking mechanism which is configured to allow or block access to all drawers 110 simultaneously. Only authorized users having a proper key can open the lock of the locking mechanism. The authorized users may include the user of the mobile phone and/or charging station provider personnel. In some examples, the proper key is a physical key, which is placed inside the lock when the drawer is available for use, and removed from the drawer while the drawer is being used. In some example, the proper key is an electronic (e.g., typed via keypad) key that is set by the user when the user first accesses the drawer (to put in his/her device) and reset after the user accesses the drawer for the second time (to retrieve the device after the device is finished charging). In some examples, a combination of a physical key and an electronic key is used. For example, the keypad may be used for initial access and, while the drawer is in use, the keypad is disabled and the user is required to use the physical key to re-open the drawer. The physical key may be provided to the user upon accessing an unused drawer using the electronic keypad. The physical key may be stored within the drawer when a mobile device is not being charged or stored inside the drawer.

Inside each drawer 110, there may be one or more charging leads compatible with most of the latest mobile phones. For example, the charging leads may include charging leads for Apple iPhone™ (e.g., iPhone™ 4 and iPhone™ 5). The charging leads may also include a charging lead for Android phones. The charging leads are connected to a charging circuit that is configured to transfer the fuel energy to electricity. Alternatively, the transfer of the energy may be performed within the fuel tank 120. The electricity is transferred from the circuit to the charging lead and from the charging lead to the mobile device. The circuit may also include a communication module configured to communicate charging status to the user.

The communication may happen between a communication module on the circuit and a communication module included in a key used to lock the drawer corresponding to the circuit. In one implementation, the communication module on the circuit receives status of charge information based on amount of charge transferred to the mobile phone through the lead. For example, if after initially charging no charge is transferred through the charging lead to the mobile device connected to the charging lead, this reflects the status of the mobile device as being fully charged. If, however, charge is being transferred from the charging lead to the mobile device connected to the charging lead, this reflects the status of the mobile device as not being fully charged. In another implementation, the battery module of the mobile device may be configured to monitor the battery level of the mobile device and communicate this information to the circuit on the mobile charging station. Once the circuit determines that the charge of the mobile device has passed a given threshold, the circuit may transfer a alert signal to a circuitry on the key. The alert signal may include a buzz signal. The buzz signal may be transferred through a short range wireless communications such as Wi-Fi, Bluetooth, ZigBee, Infrared, etc. The buzz signal may include a specific ID designed to be recognized by the circuit on the key. Upon receiving the specific ID, the buzz signal wakes up the buzzing module on the key, which causes the key to buzz and alert the user that his or her phone is charged. Alternatively, the alert signal may be any other audible sound (e.g., a beeping sound or playing of a pre-recorded message or piece of music). According to some examples, the user may personalize a message to be played when the device is done charging or the user, the user may pre-record the message, or the user may select a message from among multiple messages available at the charging station. In some examples, a non-audio signal (e.g., a flashing light, an emitted scent, a vibration of a surface or an object, etc.) may be used in place of or in addition to the audible sound.

The buzz signal may result in buzzing the key a certain number of times (e.g., three) to indicate that the phone is 50% charged if the threshold is set for 50% charge monitoring. The number of times the key is buzzed may be a preset number (e.g., four), a number set by the user, or may involve buzzing once every threshold time period (e.g., 15 seconds) until the user returns the key to the drawer. The buzz signal may also result in buzzing the key continuously to indicate that the phone is 100% charged if the threshold is set for 100% charge monitoring. In one implementation, the circuit may measure the battery level of the mobile phone against multiple thresholds and may send different buzz signals to the key when the battery level passes each threshold to alert the user of the charging status of the mobile phone. For example, one threshold may include 50% charge threshold and another threshold may include 100% charge threshold. In another implementation, the circuit may continuously transfer battery information level to the key. To this end, the key may include a user interface that displays the battery symbol along with a charge level indication of the battery within or adjacent to the displayed battery symbol. The indication may be continuously updated as the phone is charged. The indication may include a percentage number, reflecting percentage of power remaining in the battery. Alternatively or additionally, the indication may include a green light within a battery symbol, which continues to rise until it fully covers the interior space of the battery symbol on the key. In this scenario, the key may not require a buzzing module since the user can easily monitor the power status of the user's mobile phone. Nevertheless, when the phone is fully charged, a buzzing signal may activate the buzzing module to provide an additional indication to the user that his or her phone is charged.

In another implementation, the key may include a display for showing a Short Messaging Service ("SMS") type message, which can be transferred from the circuit through the short range wireless communication network or a mobile communication network. The message may display on the key that the user's mobile device is fully charged and the user can retrieve the mobile device. The above described implementations give the user the freedom to walk away from the mobile charging station 100 and attend to daily tasks while the mobile device is being charged.

The mobile charging station 100 also includes the fuel tanks 120. In alternative embodiments, the fuel tanks 120 may be replaced with (or used in addition with) any other power supply, for example, a battery, a connection to a power line, a generator, a solar power system, a wind power system, etc. The fuel tanks 120 may be refillable fuel tanks or interchangeable fuel tanks. The fuel tanks 120 may be configured to store enough fuel to charge mobile devices during the power outage in catastrophic situations. The fuel may include butane gasoline or other types of gasoline that can be converted to electricity. Depending on the work load of the mobile charging station 100, the fuel tanks 120 may be depleted before the power is restored. In this scenario, the personnel associated with the mobile charging station 100 may refill or simply exchange the fuel tanks 120. In one specific example, the mobile charging station 100 may include a circuit module that is configured to monitor the fuel level in the fuel tanks 120. The circuit module of the mobile charging station 100 may measure the fuel level against a single or multiple thresholds and may alert the appropriate personnel each time the threshold is passed. For example, one threshold may include 50% fuel threshold and another threshold may include 100% fuel threshold. The alert may be communicated via the internet to the appropriate personnel if the mobile charging station 100 has internet connectivity. Alternatively, the alert may be communicated via the mobile communication network to the appropriate personnel if the mobile charging station 100 has a mobile connectivity to the mobile communication network. In some cases, different alerts, at different levels of fuel in the fuel tanks 120 may trigger different activities. For example, 25% fuel threshold may indicate that a local (e.g., based with a threshold distance such as 50 kilometers) technician should refill the fuel tanks 120. A 10% fuel threshold may indicate that a technician should be requested to refill the fuel tanks, even if a local technician is not available. Alternatively, a rate of decrease may be used in addition to the fuel threshold level. For example, if 1% of the fuel supply is drained every day, a local technician may be requested at a 15% fuel threshold, and a remote technician may be requested at a 5% fuel threshold. Alternatively, if 10% of the fuel supply is drained every day, a local technician may be requested at 40% fuel threshold, and a remote technician may be requested at 20% fuel threshold.

In another implementation, the circuit may continuously transfer fuel information level to the appropriate personnel. To this end, the computer of the appropriate personnel monitoring the mobile charging station 100 may include a user interface that displays the fuel tank symbol along with an indication of the fuel level within or adjacent to the displayed fuel tank symbol. The indication may be continuously updated as the fuel is depleted from the fuel tank 120 to reflect the work load of the mobile charging station 100. The indication may include a percentage number, reflecting percentage of fuel remaining in the fuel tank 120. Alternatively or additionally, the indication may include a green light within a fuel tank symbol which continues to fall until it is no longer visible within the interior space of the fuel tank symbol on the user interface. In the scenario, in which the mobile charging station 100 includes multiple fuel tanks 120, the circuit may monitor each of the fuel tanks 120 individually and send fuel level information to the appropriate personnel for each fuel tank 120. The appropriate personnel may also include a different fuel tank symbol for each fuel tank 120 to monitor the fuel level in each fuel tank 120.

The tanks 120 may be mechanically coupled to a housing member containing the drawers 110. In another example, the fuel tanks 120 may be located on top or on the bottom of the housing member containing the drawers 110. The mechanism for connecting the tanks 120 to the housing member is described further below with respect to FIG. 5. Similar to the drawers 110, the tanks 120 may have different shapes, arrangements, or layouts. In one specific example, as shown in FIG. 1, the tanks 120 have a half cylindrical shape. The drawers 110 and the tanks 120 may also have different sizes. Although two separate tanks 120 are shown in FIG. 1, it is possible to modify the mobile charging station 100 to include fewer or additional tanks. For example, the mobile charging station 100 may be modified to include a single tank. The mobile charging station 100 may also be modified to include different sizes. In one specific example, the mobile charging station 100 is a small portable 1 foot unit within six securable drawers in which the users can charge their mobile phones. In another specific example, the mobile charging station 100 is a larger portable 6 feet unit with 11 securable drawers in which the users can charge their mobile phones.

Moving forward, the mobile charging station 100 also includes the solar panel 130. The solar panel 130 may act as an additional or an alternative power source during the day to the fuel source within the fuel tanks 120. The solar panel 130 also includes an antenna 150. The antenna 150 may provide an integrated mobile hotspot (Wi-Fi) connection that allows people without internet connection to access the internet with their phones, tablets or computers. To this end, the mobile charging station 100 may act as a wireless router and provide access to the internet for many device types (e.g., personal computers, video game consoles, smartphones, digital cameras, etc.) connected to the wireless router. Such a router (an access point or a hotspot) may have a range of 66-feet indoors and a greater range outdoors. The hotspot coverage can include an area as small as a single room with walls that block radio waves or as large as many square miles achieved by using multiple overlapping access points. The wireless router may allow wired and wireless Ethernet LAN devices to connect to a single WAN device such a cable modem or a DSL modem, which connects the devices to the internet.

Figure 2:
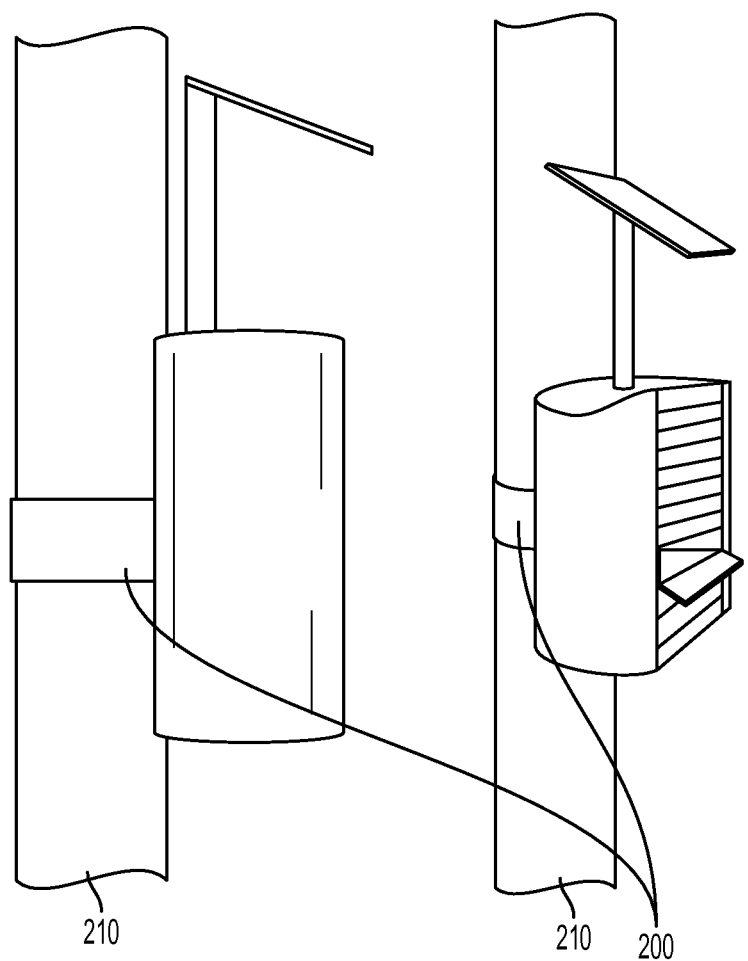
FIG. 2 illustrates an exemplary fastening element for connecting the charging mobile station shown in FIG. 1 to a facility.

FIG. 2 illustrates an exemplary fastening element 200 for connecting the charging mobile station 100 to a facility 210. The facility 210 may correspond to any public or private facility that is not easily movable and can secure the charging mobile station 100 against unauthorized removal or theft. For example, the facility 210 may be a power pole or traffic pole.

Figure 3A:
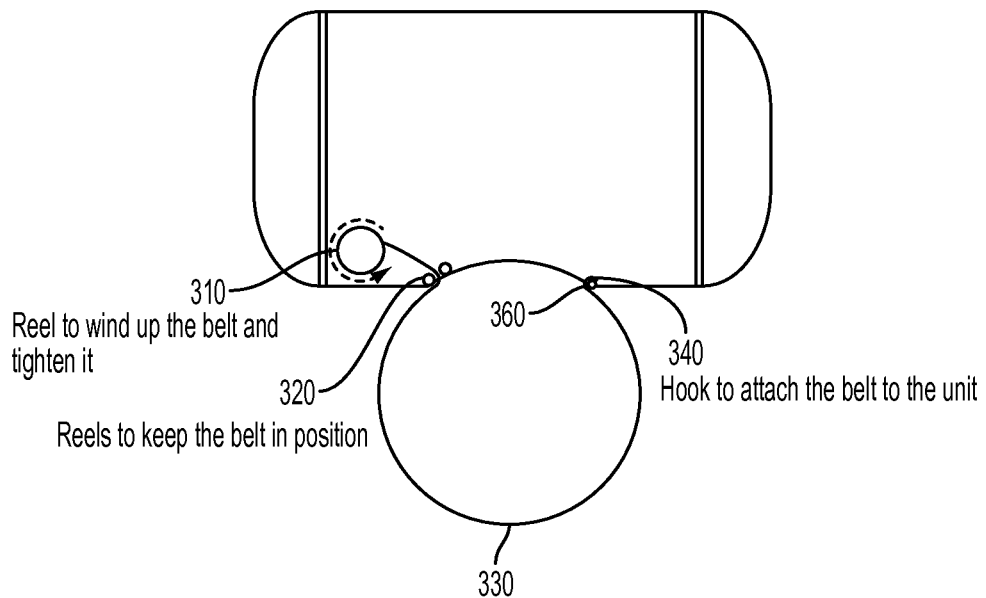
FIGS. 3A and 3B illustrate in more details the components of the exemplary fastening element shown in FIG. 2.
Figure 3B:
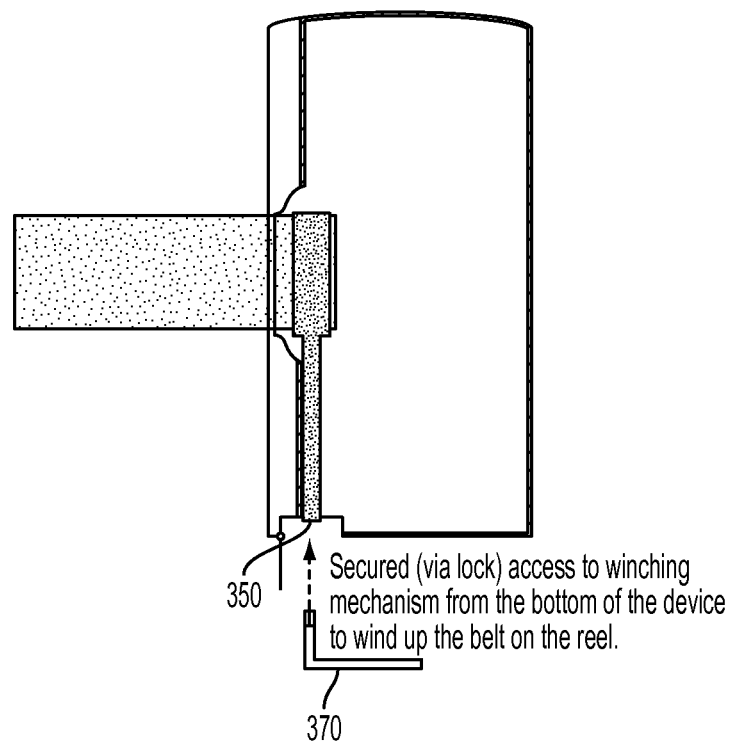

FIGS. 3A and 3B illustrate in more details the components of the exemplary fastening element 200 shown in FIG. 2. FIG. 3A shows the mobile charging station 100 when viewed from its bottom. FIG. 3B shows the mobile charging station 100 when viewed from its side. As shown in FIG. 3A, the fastening element 200 includes a first reel 310, a second reel 320, a belt 330, and a hook 340. As shown in FIG. 3B, the fastening element 200 also includes a winching mechanism 350. The first reel 310 is configured to wind up the belt 330 and tighten it against the facility 210. The belt 330 may be wrapped around the facility 210 via the first reel 310, the second reel 320, the hook 340, and the winching mechanism 350. The second reel 320 is configured to keep the belt 330 in position while the belt 330 leaves the mobile charging station 100 and secures to the attachment mechanism 360 via the hook 340. The fastening element 200 also includes the winching mechanism 350 configured to receive a fastening element 370. The fastening element 370 may engage with the winching mechanism 350 and may rotate the winching mechanism 350 to wind up the belt 330 on the first reel 310. For example, the fastening element 370 may wind up the belt 330 on the first reel 310 to extend the belt 330 outside of the mobile charging station 310. Alternatively, the fastening element 370 may wind up the belt 330 on the first reel 310 to collect the belt 330 within the mobile charging station 100 on the first reel 310. Although fastening element 200 is shown to include a belt, one of ordinary skill in art recognizes that other fastening elements can be used. Furthermore, in one implementation, no fastening element may be required to connect the mobile charging station 100 to a facility 210. For example, the mobile charging station 100 may be heavy enough that cannot be easily removed without special moving trucks. In this scenario, there may be no need to secure the mobile charging station 100 to a facility.

Figure 4:
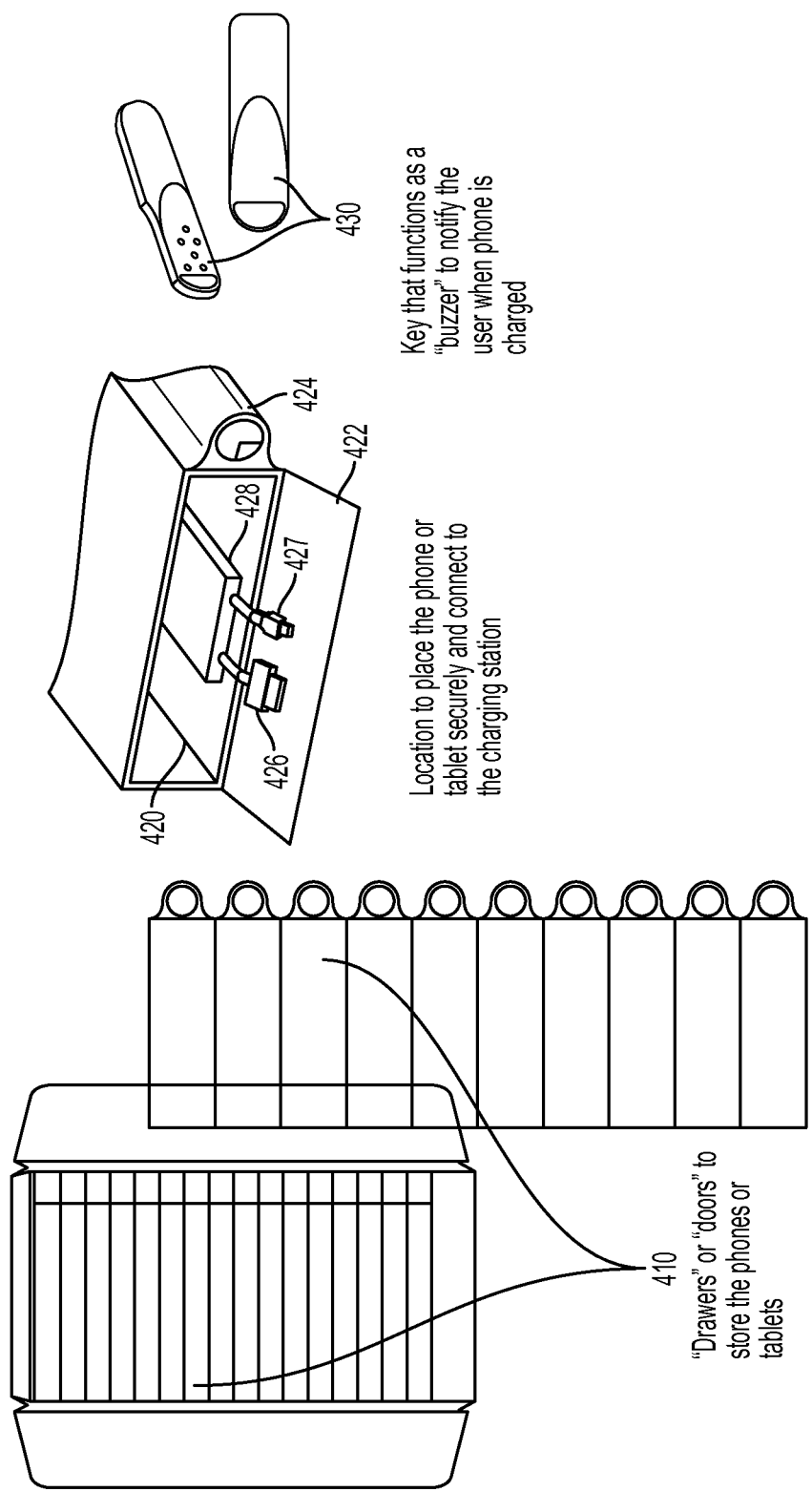
FIG. 4 illustrates components of the exemplary mobile charging station shown in FIG. 1 in more details.

FIG. 4 illustrates components of the exemplary mobile charging station 100 in more details. The drawers 410 are configured to allow secure (theft, weather) storage of mobile phones and/or tablets. The drawers 410 are arranged in a single column and each operates between a close mode and an open mode. The close mode allows no access to the content of the drawer 410. The open mode allows access to the content of the drawer 410. To this end, each drawer 410 may include a housing member 420, a door 422, and a locking mechanism 424. The locking mechanism 424 may be used to control access to the content of the drawer 410.

In one implementation, the locking mechanism 424 includes a lock and a key 430. In another implementation, the locking mechanism 424 includes an ID and an ID reader. Each of the individual drawers 410 may have its own locking mechanism 424. Alternatively, the drawers 410 may share a single locking mechanism 424, which is configured to allow or block access to all drawers 410 simultaneously. Only authorized users having a proper key can open the lock of the locking mechanism 424. The authorized users may include the user of the mobile phone and/or mobile charging station provider personnel.

In one implementation, the locking mechanism 424 can be disabled and the mobile charging station 100 may be monitored by an authorized personnel. For example, during an emergency, the authorized personnel may disable the locking mechanism 424 to allow users to more easily access the mobile charging station 100. The disabling of the locking mechanism 424 may be performed by sending a specific signal to the locking mechanism 424. The specific signal may be generated based on manual entry of a specific code on the mobile charging station 100. The specific code may be manually entered on the mobile charging station 100 or may be communicated over a wireless network to the mobile charging station 100. In either case, upon receiving the signal, the processor of the mobile charging station 100 determines whether it is a correct signal by comparing it with a previously stored signal. If it is a correct signal, the processor may send an unlock signal to the locking mechanisms 424 to disable the locking mechanisms 424.

The housing member 420 may house one or more charging leads 426, 427 compatible with most of the latest mobile phones and a charging circuit 428. For example, the charging leads may include a charging lead 426 for Apple iPhone™ (e.g., iPhone™ 4 and iPhone™ 5). The charging leads may also include a charging lead 427 for Android phones. According to some embodiments, supported and/or unsupported devices (e.g., phones or tablets) that are compatible and/or incompatible with the charging leads 426, 427 may be labeled on the front of the drawer. The charging leads 426, 427 are connected to the charging circuit 428 that is configured to transfer electricity from the fuel tank to the mobile phone. The electricity is transferred from the charging circuit 428 to the charging leads 426, 427 and from the charging leads 426, 427 to the mobile device 140. The charging circuit 428 also includes a communication module configured to communicate charging status to the user.

To charge the mobile phone, the user may first find an empty drawer 410 with a charging lead compatible with his/her mobile device. The user may then connect the compatible charging lead to the mobile phone to begin charging the phone. In one implementation, the mobile charging station begins to automatically charge the phone once the phone is connected to a compatible charging lead. In another implementation, to active the mobile charging station, the user may have to make a payment or send a message to the mobile charging station. The payment may be made via a credit card, which can be directly received at the charging station. The message may be a SMS message and may be communicated to the mobile charging station by selecting a feature on the key 430 or on the mobile charging station. Once activated, for example, a light associated with the charging lead may change color from red to green to inform the user that the charging is in progress.

The door 422 can be in an open state or a closed state. In the open state, the user has access to the content of the housing member 420. In the closed state, the user does not have access to the content of the housing member 420. In the closed state, the door can be locked or unlocked via the locking mechanism 424. The locking mechanism 424 is configured to receive a key 430. The key 430 may be designed specifically for unlocking the locking mechanism 424. To this end, once locked, the locking mechanism 424 can only be unlocked by its corresponding key 430. In one implementation, the removal of the key 430 from the locking mechanism 424 results in locking the door 422 and the return of the key 430 to the locking mechanism 424 results in unlocking the door 422. To this end, locking or unlocking may be performed electronically or mechanically. In the electronic scenario, the locking mechanism 424 may include a special electronic ID, a reader, and a comparator (not shown). For example, the key 430 may include the special electronic ID and the lock of the locking mechanism 424 may include the reader and the comparator. The special electronic ID may be an RFID tag. Once the key 430 is inserted in the locking mechanism 424, the reader is configured to read the ID and the comparator is configured to compare the read ID with a previously stored ID. If the two match, the locking mechanism 424 is configured to unlock the door of the drawer 410. Otherwise, the locking mechanism 424 is configured to maintain the door of the drawer 410 locked.

In the mechanical scenario, the key 430 may be a small piece of metal consisting of two parts, the blade and the bow. The blade slides into the keyway of the locking mechanism 424 and distinguishes between different keys. The bow protrudes from the blade so that torque can be applied by the user. For example, the rotation of the key 430 in a clockwise direction within the keyway of the locking mechanism 424 results in locking the door 422 and the rotation of the key 430 in a counter clockwise direction within the keyway of the locking mechanism 424 results in unlocking the door 422. Each key whether electrical or mechanical may be intended to operate one specific lock or a small number of locks that are keyed alike.

The key 430 may function as a buzzer to notify the user when the user's mobile phone is charged. The communication may happen between a communication module on the charging circuit 428 and a communication module included in the key 430. The communication module on the charging circuit 428 may monitor battery charge level information and transfer battery charge level information to the key 430. In one specific example, the charging circuit 428 monitors battery charge level based on the amount of charge transferred to the mobile phone 140 through the charging leads 426, 427. If no charge is transferred from the charging leads 426, 427 to the mobile device 140 connected to the charging lead 426, 427, that would reflect the status of the mobile device 140 as being fully charged. If, however, charges are being transferred through the charging leads 426, 427 to the mobile device 140 connected to the charging lead that would reflect the status of the mobile device 140 as not being fully charged.

In another implementation, the battery module of the mobile device 140 may be configured to monitor the battery level of the mobile device 140 and communicate this information to the circuit on the mobile charging station. Once the circuit determines that the mobile device is charged passed a given threshold, the circuit may transfer an alert signal to a circuitry on the key 430. The alert signal may be transferred through a short range wireless communications such as Wi-Fi, Bluetooth, ZigBee, Infrared, etc. The alert signal may include a specific ID designed to be recognized by the circuit on the key 430. Upon receiving the specific ID, the alert signal wakes up the buzzing module on the key 430, which causes the key 430 to buzz and alert the user that his or her phone is charged.

In another implementation, they key 430 may be an ID (e.g., a credit card) and the locking mechanism may be an ID reader (e.g., a credit card reader). The user may swipe his/her credit card to open a drawer 410. The user may then plug the phone into charge and close the door of the drawer 410. To retrieve the phone, the user may swipe the same card against the reader. In this scenario, the user may be notified via a text message that the mobile device 140 associated with the user has been fully charged. For example, at the time of placing the user's mobile device within the mobile charging station 100, the user may be provided with a loaner phone as described in more detail. The loaner phone may receive a text message from the charging circuit 428 within the drawer when the mobile device 140 coupled to the charging station 100 is fully charged.

Figure 5:
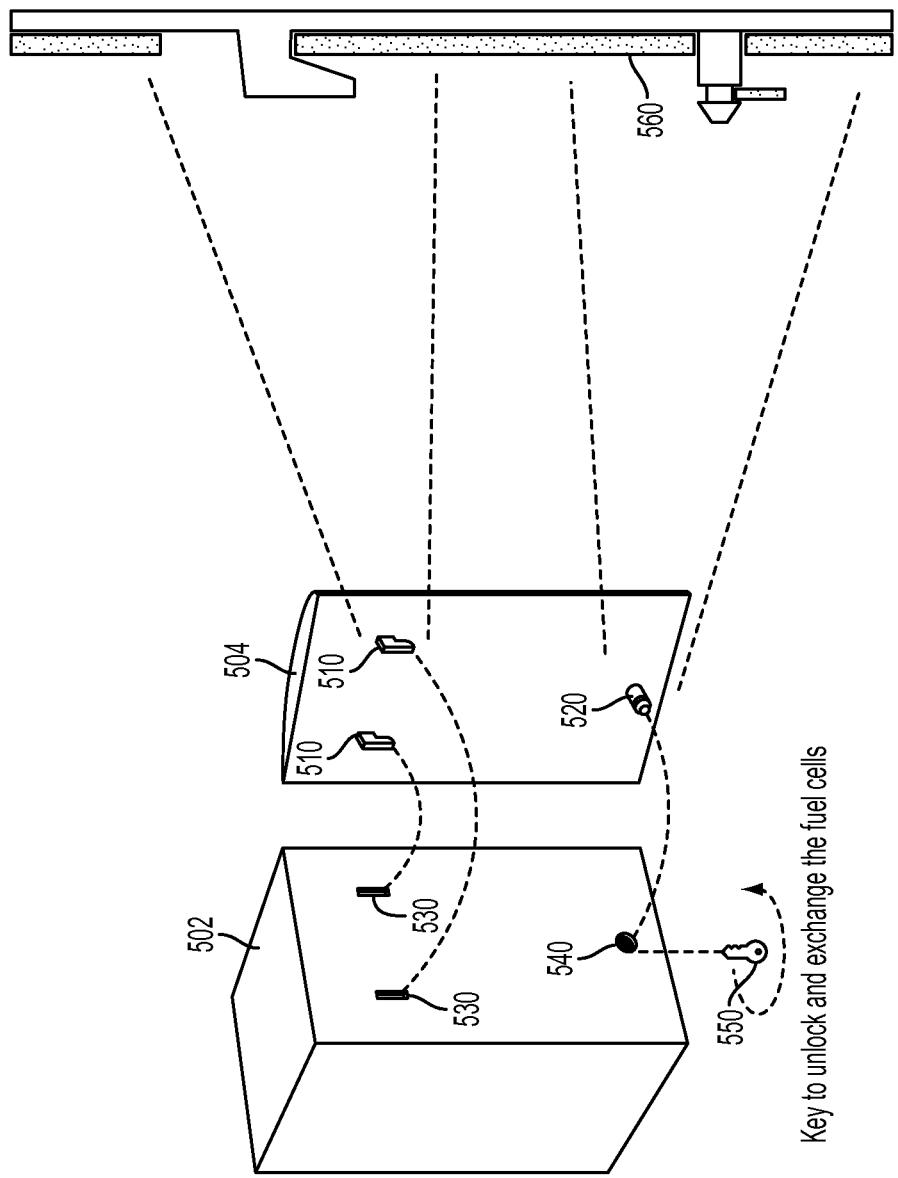
FIG. 5 illustrates an exemplary attachment mechanism for coupling a fuel tank to the charging station shown in FIG. 1.

FIG. 5 illustrates an exemplary attachment mechanism for coupling the fuel tank to the charging station 100 shown in FIG. 1. The attachment mechanism includes a plurality of protrusions 510, 520 and a plurality of holes 530, 540. The protrusions 510, 520 may be formed on the back surface of the fuel tank 504. The holes 530, 540 may be formed on the side of the housing member 502 containing the drawers. The protrusions 510 may include an upside down L shape and are configured to be received in the holes 530. The protrusion 520 may include a cylindrical shape and configured to be received by the hole 540. The protrusion 520 may include a keyway for receiving a key 550. The key 550 engages with the keyway of the protrusion 520 once the protrusion 520 is intersected within the hole 540 and locks the fuel tank 504 to the housing member 502. Rotating the key 550 clockwise may result in locking the fuel tank 504 to the housing member 502. Rotating the key 550 counter clockwise may result in unlocking the fuel tank 504 from the housing member 502. Alternatively, rotating the key 550 counter clockwise may result in locking the fuel tank 504 to the housing member 502, while rotating the key 550 clockwise may result in unlocking the fuel tank 504 from the housing member 502. In one specific example, the rotating of the key 550 clockwise may result in lifting the plate 560 located within the housing member 502 upward to move the protrusions 510 closer to the upper portion of the holes 530 and thereby preventing the protrusions 510 from being removed from the housing member 502. Similarly, rotating of the key 550 counter clockwise may result in lifting the plate 560 located within the housing member 502 downward to move the protrusions 510 away from the upper portion of the holes 530 (as shown in FIG. 5) and thereby allowing the protrusions 510 to be removed from the housing member 502.

Figure 6:
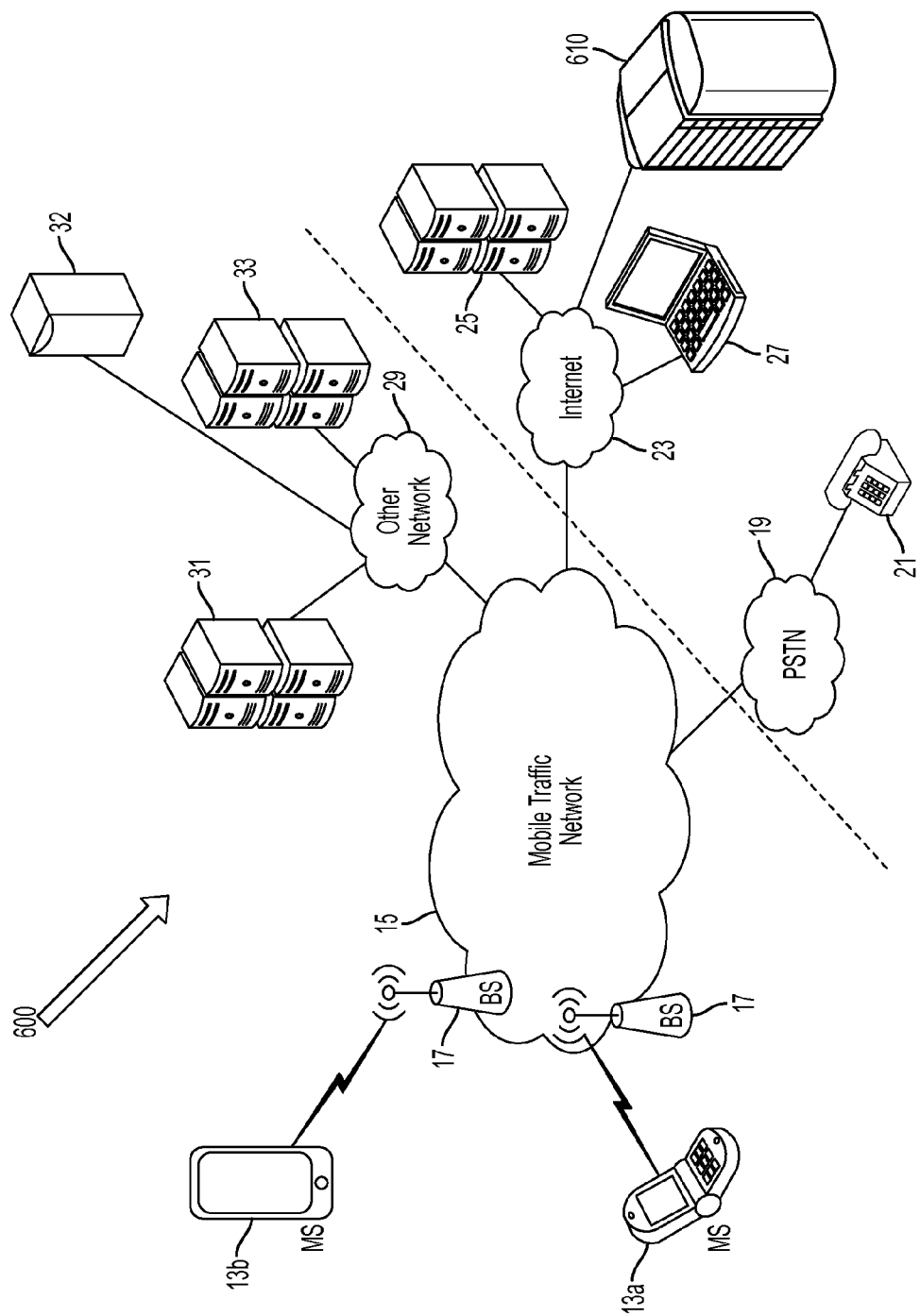
FIG. 6 illustrates an exemplary system offering a variety of mobile communication services, including communications for mobile charging stations.

FIG. 6 illustrates an exemplary system 600 offering a variety of mobile communication services, including communications for mobile charging stations. The example shows simply two mobile devices (MSs) 13a and 13b as well as a mobile communication network 15. The stations 13a and 13b are examples of mobile devices which may be located in a region experiencing catastrophic events, resulting in a power outage. However, the network 600 will provide similar communications for many other similar users as well as for mobile devices that are experiencing power outage regardless of the reason for the outage. The network 15 provides mobile wireless communications services to those stations as well as to other mobile devices (not shown), for example, via a number of base stations (BSs) 17. The present techniques may be implemented in any of a variety of available mobile networks 15 and/or on any type of mobile station compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile devices 13a and 13b may be capable of voice telephone communications through the network 15. The mobile devices 13a and 13b may also take advantage of other services provided by the network such as free charging during power outages. To this end, the system 600 may include a mobile charging station 610 and the devices 13a and 13b may be configured to access application software to easily locate the position of the mobile charging station 610.

The application software may be hosted in an application server 31 or 25. In one specific example, the application server 31 or 25 may host a mobile account application such as My Verizon™ application. The mobile account application (e.g., My Verizon™) provides the users of the mobile devices 13a and 13b with information regarding their mobile accounts. The information may include mobile usage summary, bill pay, change plan, manage safeguards or set alert information. The mobile usage summary may include usage of individual and/or shared minutes, messages, and data. The information may also include location information about a physical location of the mobile charging station 610. For example, My Verizon™ page of the user may inform the user that he/she lives in an area that has been affected by a power outage. My Verizon™ page may further inform the user that Verizon™ offers free charging services and asks the user to select a feature (e.g., a continue button) on the user interface to see various locations associated with the mobile charging stations 610. The mobile charging station 610 may be similar to the mobile charging station 100 shown in FIG. 1. Therefore, for sake of simplicity and brevity of description, the various components of the mobile charging station 610 are not described here. Although one mobile charging station 610 is shown, the system 600 may include a plurality of charging stations 610 located in various areas affected by the power outage. The charging stations 610 may be located in areas with a large amount of foot traffic such as airports, terminals, and/or malls. The mobile charging stations 610 may also be installed in a rural area. In yet another alternative, the mobile charging stations 610 may be located within the stores of the mobile service provider networks.

The mobile charging station 610 may be connected to the network 15 via internet 23. For example, the mobile charging station may include an antenna, which may provide an integrated mobile hotspot (Wi-Fi) connection that allows people without internet connection to access the internet with their phones, tablets or computers. To this end, the mobile charging station 610 may act as a wireless router and provide access to the internet for many device types (e.g., personal computers, video game consoles, smartphones, digital cameras, etc.) connected to the wireless router. The wireless router may be connected to the internet via a cable modem or a DSL modem. The wireless router may include the cable or DSL modem or may be configured to connect to the cable or DSL modem devices. In either case, the router provides wireless connectivity for devices within its range to the internet. Furthermore, the mobile charging station 610 may include Global Positioning System (GPS) and may communicate this information via the internet to the operator of the mobile network 600.

For location based services, including identifying location of the mobile charging station 610 during power outage, network 600 also includes PDE 32. In assisted GPS (global positioning system) type deployments, for example, PDE 32 provides data to mobile charging station 610 to expedite satellite acquisition; it may determine the actual latitude and longitude (final fix) of mobile charging station 610 based on GPS measurements taken by mobile charging station 610 at the PDE's 32 request.

The process of locating the mobile charging station 610 may involve several elements. In practice, the mobile device 13*a* or 13*b* may submit the request through My Verizon™ to the server 31. In response, the server 31 requests location information for a particular mobile charging station 610 from PDE 32. The PDE 32 utilizes different techniques to provide a reliable position location for the mobile charging station 610. In one scenario, in which mobile charging station 610 has a clear view of the sky, PDE 32 may be using GPS signals for position determination. If the mobile charging station 610 does not receive sufficient GPS signals, the PDE 32 may use a combination of GPS and a pilot signal provided by a BTS, such as, for example, BTS associates with the base station 17 for position determination. This may be possible if the mobile charging station 610 is provided with a mobile network connectivity independent or in addition to the internet connectivity via the cable modem or the DSL modem. For example, the mobile charging station 610 may include a SIM card provided by the mobile service provider. To this end, if the mobile charging station 610 receives no GPS signals, PDE 32 may use the pilot signals provided by two or more of the BTSs, assuming there are sufficient numbers of them to enable trilateration, and may calculate through vector math the location of the mobile charging station 610. Alternatively or additionally, if the mobile charging station 610 reports that it hears two or more pilot signals associated with two or more BTSs, PDE 32 identifies the location of mobile charging station 610 to be in the area where the footprints of the two or more BTSs overlap.

To perform these calculations, PDE 32 may reference a database. The database may be referred to as a Base Station Almanac Database. The network elements that can be ranged to terrestrially are identified in the database. When the mobile charging station 610 detects a pilot signal during a location assessment attempt, the mobile charging station 610 reports the pilot signal that it hears. This information is sent to the network and routed to PDE 32. In this manner, the mobile charging station 610 identifies to PDE 32, the sector that is serving mobile charging station 610 and possibly one or more other base station sector pilots that charging station 610 hears (for sectors nearby but not currently servicing the mobile charging station 610).

The PDE 32 will reference the database to determine what are the appropriate properties of those BTSs that can be heard and with the information that is available makes its calculation as best as it can. In one implementation, the database includes for each pilot signal a sector identification label, a coordinate pair associated with the source of the pilot signal, and/or a Maximum Antenna Range (MAR) value field which defines a reasonable boundary for the coverage footprint of the source of the pilot beacon signal. In yet another alternative, the PDE 32 may associate the location of the mobile charging station 610 with a location registered for the Wi-Fi network the mobile charging station 610 is accessing.

Once located, the mobile charging station 610 can be used to charge mobile devices such as 13*a* and 13*b* located within an area experiencing a power outage. Once charge, the devices 13*a* and 13*b* can utilize the network 15 to place and receive telephone calls to each other as well as through the public switched telephone network or "PSTN" 19 and telephone stations 21 connected to the PSTN. The network 15 typically offers a variety of data services via the internet 23, such as downloads, web browsing, email, etc. By way of example, the drawing shows a laptop PC type user terminal 27 as well as a server 25 connected to the internet 23. The data services for the mobile devices 13*a* and 13*b* via the internet 23 may be with devices like those shown as server 25 and user terminal 27 as well as with a variety of other types of devices or systems capable of data communications through various interconnected networks. The mobile devices 13*a* and 13*b* also can receive and execute applications written in various programming languages, as discussed more hereafter.

Mobile devices 13*a* and 13*b* can take the form of portable handsets, smart-phones or personal digital assistants, although they may be implemented in other form factors. For example, a mobile station application can be written to execute on a binary runtime environment for a (BREW-based) mobile station, a Windows Mobile based mobile station, Android, iPhone™, Java Mobile, or RIM based mobile station such as a BlackBerry™ or the like. Some of these types of devices can employ a multi-tasking operating system.

The mobile communication network 600 can be implemented by a number of interconnected networks. Hence, the overall network 600 may include a number of radio access networks (RANs), as well as regional ground networks interconnecting a number of RANs and a wide area network (WAN) interconnecting the regional ground networks to core network elements. A regional portion of the network 600, such as those serving mobile devices 13*a* and 13*b*, can include one or more RANs and a regional circuit and/or packet switched network and associated signaling network facilities.

Physical elements of a RAN operated by one of the mobile service providers or carriers include a number of base stations represented in the example by the base stations (BSs) 17. Although not separately shown, such a base station 17 can include a base transceiver system (BTS), which can communicate via an antennae system at the site of base station and over the airlink with one or more of the mobile devices 13, when the mobile devices are within range. Each base station can include a BTS coupled to several antennae mounted on a radio tower within a coverage area often referred to as a "cell." The BTS is the part of the radio network that sends and receives RF signals to/from the mobile devices 13a and 13b that are served by the base station 17.

The radio access networks can also include a traffic network represented generally by the cloud at 15, which carries the user communications and data for the mobile devices 13a and 13b between the base stations 17 and other elements with or through which the mobile devices communicate. The network can also include other elements that support functionality other than device-to-device media transfer services such as messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 600, and those elements communicate with other nodes or elements of the network 600 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 600, which communicate through the intranet type network 29, include one or more application servers 31 and a related authentication server 33 for the application service of server 31.

A mobile station 13a or 13b communicates over the air with a base station 17 and through the traffic network 15 for various voice and data communications, e.g. through the internet 23 with a server 25 and/or with application servers 31. If the mobile service carrier provides a service for locating the mobile charging station 610, the service may be hosted on a carrier-operated application server 31. The application server 31 may communicate with the devices 13a and 13b via the networks 15 and 29. Alternatively, the service for locating the mobile charging station 610 may be hosted on an application server such as server 25 connected for communication via the networks 15 and 23. Servers such as 25 and 31 may provide any of a variety of common application or service functions in support of or in addition to an application program running on the mobile station 13. However, for purposes of further discussion, we will focus on functions thereof in support of mobile charging station 610. For a given service, including the location of the mobile charging station 610, an application program within the mobile station may be considered as a 'client' and the programming at 25 or 31 may be considered as the 'server' application for the particular service.

To insure that the application service offered by server 31 is available to only authorized devices/users, the provider of the application service also deploys an authentication server 33. The authentication server 33 could be a separate physical server as shown, or could be implemented as another program module running on the same hardware platform as the server application 31. Essentially, when the server application (server 31 in our example) receives a service request from a client application on a mobile station 13a or 13b to locate the mobile charging station 610, the server application provides appropriate information to the authentication server 33 to allow server 33 to authenticate the mobile station 13a or 13b as outlined herein. Upon successful authentication, the server 33 informs the server application 31, which in turn provides access to the service via data communication through the various communication elements (e.g. 29, 15 and 17) of the network 10. For example, the server application 31 sends a request to the PDE 32 to identify the location of the mobile charging station 610 within the vicinity of the mobile device. In response, the PDE 32 identifies the location of the mobile charging station 610 within the vicinity of the mobile device and sends this information to the server application 31. The server application 31 will forward this information to the user of the mobile device.

Figure 7:
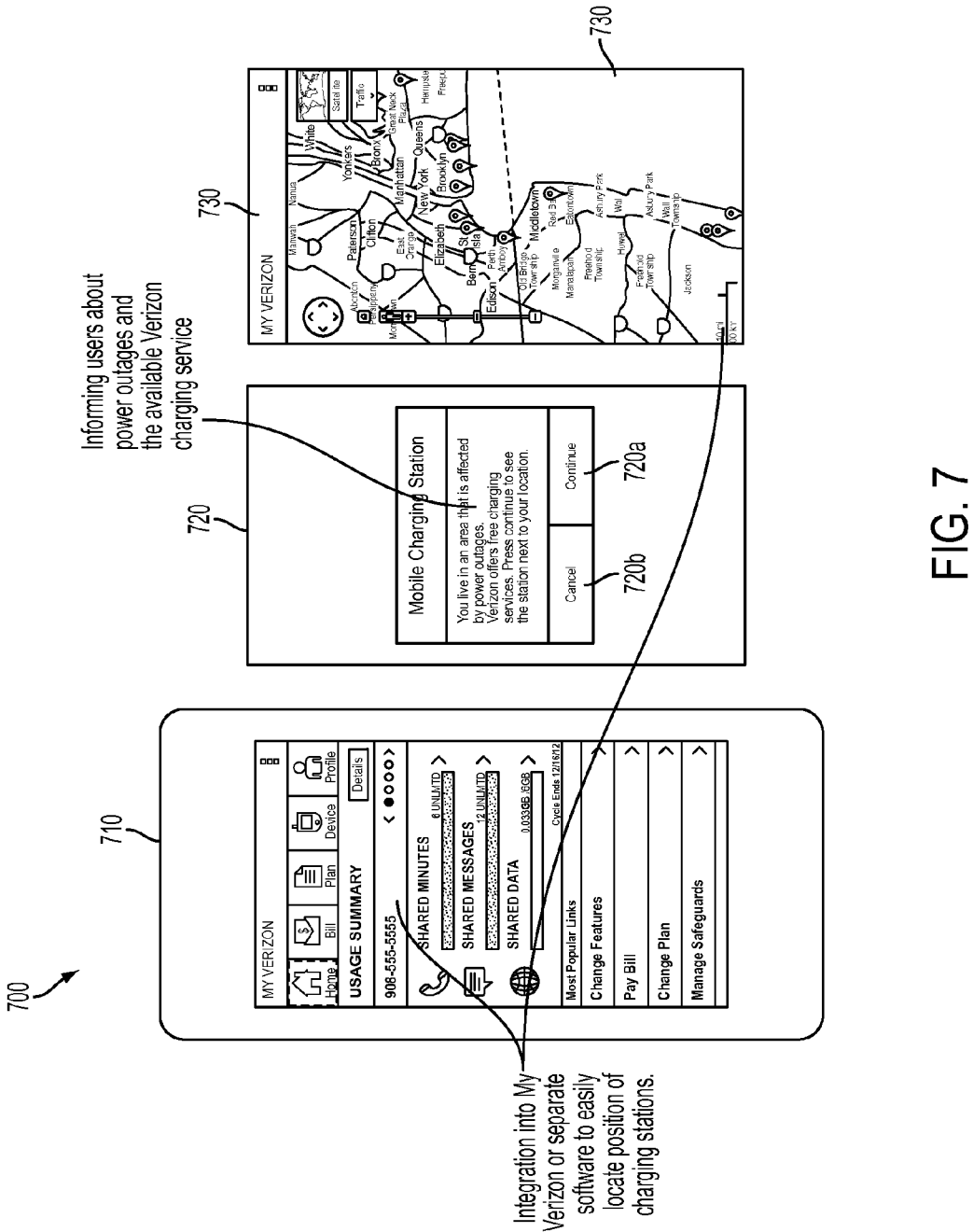
FIG. 7 illustrates an exemplary user interface displayed on a mobile device located in the area affected by a power outage.

FIG. 7 illustrates an exemplary user interface 700 displayed on a mobile device located in the area affected by a power outage. The mobile device may correspond to one of the mobile devices 13a or 13b shown in FIG. 6. The user of the mobile device may be located in an area affected by the power outage and may be interested in charging his/her phone. To this end and referring also to FIG. 6, the user may access the My Verizon™ page hosted on the application server 31. Upon accessing the My Verizon™ page, the device displays on the user interface information 710 about mobile usage summary. The display may then be automatically updated to include a pop up window 720 informing the user that he/she lives in an area affected by the power outage. The pop up window 720 may further inform the user that Verizon™ offers free charging services and may ask the user to press the continue button 720a to see the station closest to the user's location or press the cancel button 720b if the user is not interested in the location of the mobile charging station 610. Upon selecting the continue button 720a, a request is sent from the server 31 to PDE 32 to identify the locations of the mobile charging stations 610 within proximity of the user. The PDE 32 may determine the locations of the mobile device and the mobile charging stations 610 based on the methods discussed above and identify the locations of various mobile charging stations 610 to the server 31. The server 31 may then update the user interface 700 to show the various locations of the mobile charging stations 610 as shown in the display 730. The mobile device may also help the user to navigate to one of the mobile charging stations 610 selected by the user by providing a turn-by-turn navigation.

As noted above, the mobile charging station 610 may be located in an area with high foot traffic such as, for example, airports, malls, shopping centers, etc. The mobile charging station 610 may also be located in a rural area. In yet another alternative, the mobile charging station 610 may be located within a store of a mobile service provider (e.g., Verizon™). In the latter scenario, the user may turn his or her phone in to the Verizon™ personnel for charging the phone. The Verizon™ personnel may connect the phone to the mobile charging station 610 and may give the user a loaner phone to allow the user to maintain connectivity with his or her contacts while the user's phone is being charged.

The loaner phone may be programmed to include some or all of the information stored on the user's phone that is being charged. In one example, where the user's phone is SIM card based, the SIM card can be retrieved from the phone and placed in the loaner phone. The SIM card may program the loaner phone to include some or all of the information stored on the user's phone along with the user's Mobile Directory Number (MDN). This allows the user to maintain connectivity with the user's contact. In another scenario, where the user's phone is not SIM card based, the phone may be programmed to include special software, which configures the phone to connect (via a wire or wirelessly) with a loaner phone and transfer the user's information on the phone to the loaner phone. After the user returns the loaner phone, the loaner's phone memory may be reset either automatically using software within the loaner phone or manually by a technician. The software may know when the loaner phone is returned, for example, based on the SIM card being removed or based on the technician entering an input corresponding to the phone being returned. Alternatively, the phone may reset its own memory once every threshold time period (e.g. once every two hours) so that the user's information is not stored in the event that the technician forgets to or fails to enter the input. As shown by the above discussion, functions relating to charging via the mobile charging station may be implemented on computers connected for data communication via the components of a packet data network of FIG. 6. Although special purpose devices may be used, such devices may also be implemented using one or more hardware platforms intended to represent a general class of data processing device commonly used to run "server" programming so as to implement charging the mobile device in an area affected by a power outage, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data (e.g. files used for charging mobile device using a mobile charging station and for locating the mobile charging station). The software code is executable by the general-purpose computer that functions as the mobile charging station, the PDE, the mobile application server, and/or that functions as a mobile terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for charging a mobile device located in an area affected by a power outage, using essentially the manner performed in the implementations discussed and illustrated herein.

Figure 8:
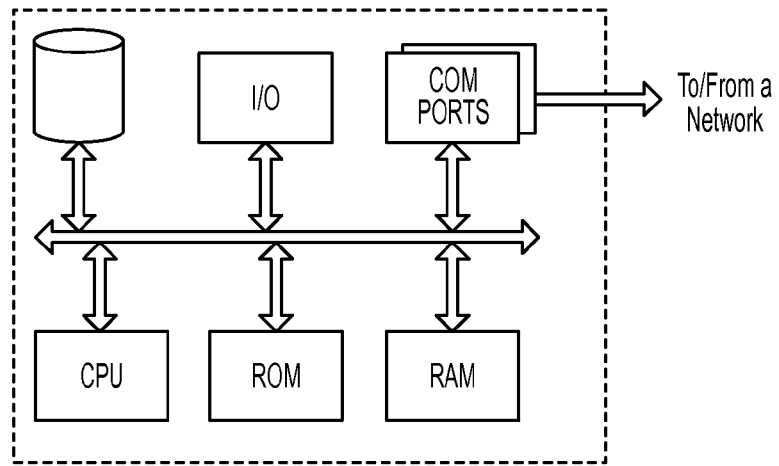
FIGS. 8 and 9 provide functional block diagram illustrations of general purpose computer hardware platforms.
Figure 9:
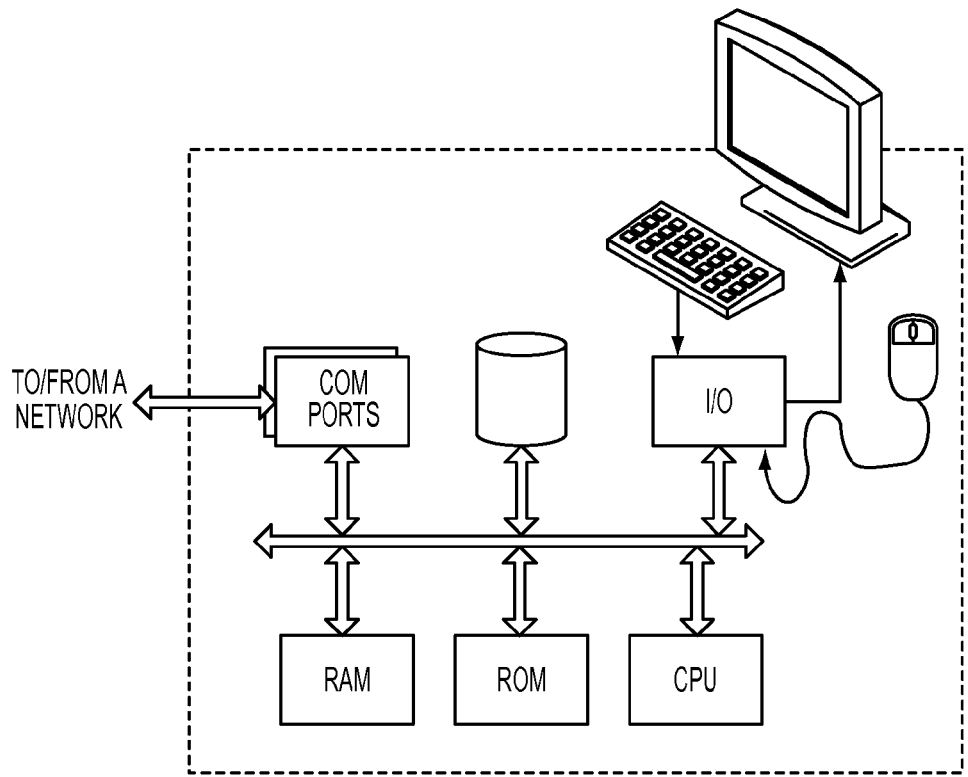

FIGS. 8 and 9 provide functional block diagram illustrations of general purpose computer hardware platforms. FIG. 8 illustrates a network or host computer platform, as may typically be used to implement a server. FIG. 9 depicts a computer with user interface elements, as may be used to implement a personal computer or other type of work station or terminal device. FIG. 8 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs. A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of charging a mobile device located in an area affected by a power outage outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the internet or various other telecommunication networks. Such communications, for example, may enable loading of the software from one computer or processor into another, for example, from a management server or host computer of the wireless network provider into the computer platform of the analytics engine. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the functionality associated with the mobile charging station, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

To this end, the instant application describes a mobile charging station for charging mobile phones and tablets during power outage. The mobile charging station may be a small portable unit that provides charging capabilities independently from an existing power source. These relatively small units may be brought out into urban, suburban, and rural streets during catastrophic events. The mobile charging station may be configured to be fixed to equipment that is secure and not easily movable such as, for example, power poles, traffic lights, or other non-removable facilities that could secure the mobile charging station and reduce the possibility of theft or unauthorized removal. The user leaves the phone/tablet at the mobile charging station and the key to the 'locker type' charging station may include a 'buzzer' to inform the user of the charging status of the phone/tablet. The mobile charging station may be a fuel-cell system that can be refilled by service personnel, depending on the usage. The use of the fuel cells allows the mobile charging station to be brought into remote areas and the fuel cells to be refilled (or simply exchanged) at the location of the station. The mobile charging station may include a geo-locating system configured to report location information of the mobile charging station to the users. The mobile charging station may also be configured as a mobile hotspot providing internet connectivity to the users.

According to some embodiments, when the mobile charging station is moved, an urgent message is provided to users whose devices (e.g., phones or tablets) are still being charged in the charging station. The urgent message may be provided via email. In some examples, if a loaner phone is provided to users whose devices are being charged, the urgent message may be transmitted to the loaner phone via telephone call, voicemail or short messaging service (SMS). In some cases, if a user's home telephone number, office telephone number or significant other's telephone number is known, the urgent message may be transmitted via telephone call or voicemail to the home telephone number or office telephone number, or the urgent message may be transmitted to the significant other's telephone number via telephone call, voicemail, or SMS.

In one general aspect, the instant application describes a mobile charging station that includes a plurality of drawers, a fuel tank, and a fastening element. Each drawer is configured to allow for secure storage of a mobile device and includes a charging lead and a charging circuit configured to connect to the charging lead and to charge the mobile device connected to the charging lead. The fuel tank is coupled to the plurality of drawers and includes a sustainable energy source configured to provide electricity to the charging circuit for charging the mobile device connected to the charging lead. The fastening element is coupled to the plurality of the drawers and is configured to secure the charging station to a facility to reduce a possibility of unauthorized removal.

The above general aspect may include one or more of the following features. The drawers may be stacked laterally in a column and each may include a housing member, a door, and a key mechanism. The housing member may include the charging lead and the charging circuit. The key mechanism may include a keyway and a key for locking or unlocking the door. The key may include an alert mechanism configured to alert a user associated with the mobile device about a charging status of the mobile device. The alert mechanism may include a buzzer, and the buzzer may be configured to inform the user that the mobile device is fully charged.

The fuel tank may be a refillable or exchangeable fuel tank, and the fuel may be a butane gasoline. The fastening element may include a belt configured wrap around the facility. The fasting element may further include a first real configured to wind up the belt and tighten the belt, a second real configured to keep the belt in position as the belt leaves the mobile charging station and wraps around the facility, and a hook configured to secure the belt to the mobile charging station. The fasting element may be connected to a winching mechanism to wind up the belt on the first real.

The mobile charging station may also include a solar panel configured as an additional or an alternative power source to fuel within the fuel tank. The solar panel may include an antenna configured to provide an integrated mobile hotspot (Wi-Fi) connection that allows people without internet connection to access the internet with their phones, tablets or computers. The mobile charging station may be portable. The facility may include a power pole or a traffic light. The mobile charging station may further include a geo-locating system that is configured to identify a location of the mobile charging station and to communicate the location of the mobile charging station to a mobile service provider network.

In another general aspect, the instant application describes a mobile charging station that includes a plurality of drawers each configured to allow for secure storage of a mobile device, each drawer including a charging lead and a charging circuit configured to connect to the charging lead and to charge the mobile device connected to the charging lead; a fuel tank coupled to the plurality of drawers and including a sustainable energy source configured to provide electricity to the charging circuit for charging the mobile device connected to the charging lead; and a geo-locating system configured to identify a location of the mobile charging station and to communicate the location of the mobile charging station to a mobile service provider network.

The above general aspect may include one or more of the following features. The geo-locating system may be configured to receive a request from a position determining entity and in response to the request send position information associated with the location of the mobile charging station to the position determining entity. The geo-locating system may include a Global Positioning System.

The mobile charging station may further include a fastening element coupled to the plurality of the drawers and configured to secure the charging station to a facility to reduce a possibility of unauthorized removal. The fastening element may include a belt configured wrap around the facility. The fasting element may further include a first real configured to wind up the belt and tighten the belt, a second real configured to keep the belt in position as the belt leaves the mobile charging station and wraps around the facility, and a hook configured to secure the belt to the mobile charging station.

The drawers may be stacked laterally in a column and each may include a housing member, a door, and a key mechanism. The housing member may include the charging lead and the charging circuit. The key mechanism may include a keyway and a key for locking or unlocking the door. The key may include an alert mechanism configured to alert a user associated with the mobile device about a charging status of the mobile device. The alert mechanism may include a buzzer. The buzzer may be configured to inform the user that the mobile device is fully charged. The mobile charging station may further include a solar panel configured as an additional or an alternative power source to fuel within the fuel tank. The solar panel may include an antenna configured to provide an integrated mobile hotspot (Wi-Fi) connection that allows people without internet connection to access the internet with their phones, tablets or computers.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile charging station comprising:
   a plurality of drawers each configured to allow for secure storage of a mobile device, the plurality of drawers including a first drawer;
   the first drawer including a charging lead and a charging circuit configured to connect to the charging lead and to charge the mobile device when connected to the charging lead, wherein:
   the charging circuit includes a first communication module,
   the first drawer is associated with a first key,
   the first key includes a second communication module,
   the second communication module is configured to receive charging status information of the mobile device from the first communication module, and
   the first key is configured to communicate the charging status information to a user.

2. The mobile charging station of claim 1, wherein:
   the drawers are stacked laterally in a column;
   the first drawer includes a housing member, a door, and a locking mechanism,
   the housing member includes the charging lead and the charging circuit,
   the locking mechanism includes a keyway configured to receive the first key for locking or unlocking the door.

3. The mobile charging station of claim 1, wherein the first communication module is configured to transmit an alert signal to the second communication module when the charging circuit determines that a charge associated with a battery of the mobile device has passed a specified threshold.

4. The mobile charging station of claim 1, further comprising an off-the-grid power source coupled to the plurality of drawers and configured to provide electricity to the charging circuit for charging the mobile device when the mobile device is connected to the charging lead.

5. The mobile charging station of claim 4, wherein the power source comprises a solar panel.

6. The mobile charging station of claim 5, wherein the solar panel includes an antenna configured to provide an integrated mobile hotspot (Wi-Fi) connection that allows devices without internet connection to access the internet.

7. The mobile charging station of claim 4, wherein:
the power source comprises a refillable or exchangeable fuel tank or a battery, and
the mobile charging station includes a circuit module configured to monitor a fuel level of the power source and alert mobile service provider personnel when specified fuel thresholds are passed.

8. The mobile charging station of claim 1, wherein:
the first key includes a user interface that is configured to display charging status information, and
the displayed charging status information is continuously updated as the mobile device is charged.

9. The mobile charging station of claim 1, wherein the first key communicates the charging status information by providing a tactile notification to the user.

10. The mobile charging station of claim 1, wherein the first key communicates the charging status information by providing an audible notification to the user.

11. The mobile charging station of claim 1, wherein:
each drawer in the plurality of drawers, when unoccupied by a mobile device, is capable of being opened by typing an electronic keyword into a keypad; and
each drawer in the plurality of drawers, when occupied by the mobile device, is capable of being opened using a mechanical key that is stored within the drawer when the drawer is unoccupied by the mobile device.

12. A mobile charging station comprising:
a housing comprising a plurality of drawers each configured to allow for secure storage of a mobile device, each drawer including a charging lead and a charging circuit configured to connect to the charging lead and to charge the mobile device connected to the charging lead;
an off-the-grid power source coupled to the plurality of drawers configured to provide electricity to the charging circuit for charging the mobile device connected to the charging lead, wherein the power source includes a refillable or exchangeable fuel tank or a battery; and
an attachment mechanism for coupling the power source to the housing, the attachment mechanism including a plurality of protrusions formed on a surface of the power source and a plurality of holes formed on a side of the housing, wherein each of the plurality of holes is configured to receive a protrusion of the plurality of protrusions, thereby securing the power source to the housing.

13. The mobile charging station of claim 12, wherein at least one protrusion of the plurality of protrusions comprises an upside-down L shape.

14. The mobile charging station of claim 12, wherein one protrusion of plurality of protrusions comprises a cylindrical protrusion, the cylindrical protrusion including a keyway that is configured to receive a key.

15. The mobile charging station of claim 14, wherein:
the cylindrical protrusion is configured to be inserted into a hole of the plurality of holes, and
the cylindrical protrusion locks the power source to the housing when the key is rotated in a first direction within the keyway.

16. The mobile charging station of claim 12, further comprising a fastening element coupled to the plurality of the drawers and configured to secure the charging station to a facility to reduce a possibility of unauthorized removal.

17. The mobile charging station of claim 12, wherein:
the drawers are stacked laterally in a column and each includes a housing member, a door, and a key mechanism,
the housing member includes the charging lead and the charging circuit, the key mechanism includes a keyway and a key for locking or unlocking the door, and the key includes an alert mechanism configured to alert a user associated with the mobile device about a charging status of the mobile device.

18. The mobile charging station of claim 17, wherein:
the alert mechanism includes a buzzer, and
the buzzer is configured to inform the user that the mobile device is fully charged.

19. The mobile charging station of claim 17, wherein the key is configured to provide multiple notifications regarding the charging status to the user, wherein each notification is associated with a different charging threshold.

20. The mobile charging station of claim 12, further comprising a geo-locating system configured to identify a location of the mobile charging station and to communicate the location of the mobile charging station to a mobile service provider network, the geo-locating system being configured to receive a request from a position determining entity and in response to the request send position information associated with the location of the mobile charging station to the position determining entity, and wherein the geo-locating system includes a Global Positioning System.

* * * * *